United States Patent

[11] 3,550,796

| [72] | Inventor | Fedde Walda<br>15 Leendert Sparreboomstraat, Rotterdam, Netherlands |
|---|---|---|
| [21] | Appl. No. | 762,817 |
| [22] | Filed | Sept. 26, 1968 |
| [45] | Patented | Dec. 29, 1970 |
| [32] | Priority | Sept. 29, 1967 |
| [33] | | Great Britain |
| [31] | | No. 44,542/67 |

[54] METHOD OF TRANSSHIPMENT OF CONTAINERS FROM A CONTAINER SHIP TO LOADING PLATFORMS
5 Claims, 1 Drawing Fig.

[52] U.S. Cl. ............................................. 214/152, 214/14
[51] Int. Cl. ........................................... B63b 27/00
[50] Field of Search............................. 214/152, 38.42, 16B, 14

[56] References Cited
UNITED STATES PATENTS

| 724,859 | 4/1903 | Harding | (214/14UX) |
| 1,247,040 | 11/1917 | Von Puhl | 214/14 |
| 1,944,771 | 1/1934 | Webb et al | 214/152 |
| 2,793,766 | 5/1957 | Fetchko | 214/16(B) |
| 3,091,188 | 5/1963 | Graham | 214/14X |
| 3,093,252 | 6/1963 | Cahill | 214/16(B) |

*Primary Examiner*—Gerald M. Forlenza
*Assistant Examiner*—Frank E. Werner
*Attorney*—Marshall & Yeasting ABSTRACT: In this method the containers are transferred from the container ship to a first storage structure serving as a buffer. After the containers have been so transferred, they are conveyed to a second storage structure having substantially the same storage capacity as the first storage structure, and during the conveying the containers are sorted according to destination. The containers are stacked in groups according to destination in the second storage structure. After the containers have been so stacked, they are conveyed to a third storage structure having substantially the same storage capacity, while keeping the containers in the groups according to destination. During this conveying operation the containers are sorted within each such group into subgroups according to means of regional transportation. The containers are stacked in the third storage structure in groups according to destination divided into subgroups according to means of regional transportation, and after the containers have been so stacked they are conveyed to transfer each subgroup to a separate loading platform for regional transportation.

3,550,796
PATENTED DEC 29 1970
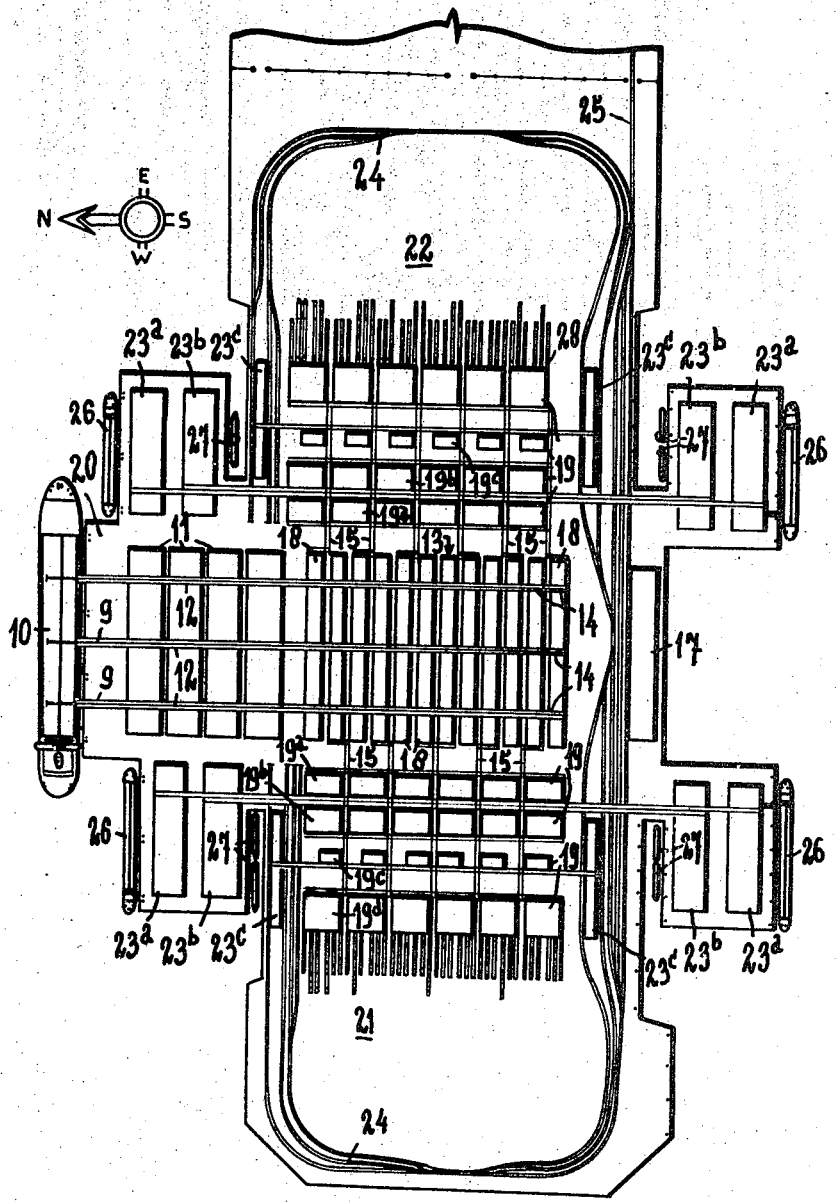

METHOD OF TRANSSHIPMENT OF CONTAINERS FROM A CONTAINER SHIP TO LOADING PLATFORMS

The present invention relates to a system for controlling the transshipment of containers from a mammoth container ship towards loading platforms for local transport.

Such mammoth container ships measuring 100,000 to 250,000 tons and more are used to a steadily increasing extent for the intercontinental shipment of goods, the goods from various regions of one continent being centrally loaded and after arrival at another continent being also centrally unloaded for dispatching to various regions by local transport means. Thus, the mammoth container ships merely maintain the intercontinental transit traffic, but do not take part in the local sea traffic which is reserved to smaller ships.

SUMMARY OF THE INVENTION

The invention aims at providing a method for transferring containers, during or after unloading of a mammoth container ship, to the various means of local transport in a convenient, quick and efficient manner.

The method according to the invention is characterized in that the containers during unloading of the ship are stacked in a first storage structure, hereinafter called a storage room, serving as a buffer, thence successively conveyed to two further storage rooms of the same capacity as the first one, during which conveying step the containers are successively sorted so that they are stacked in one storage room according to the country of destination or group of countries and in the other storage room according to the local transport means and are conveyed from the third storage room to the various loading platforms for local transport.

The containers in question are so-called small standardized containers of almost cubic shape with a storage capacity of some 1.5 m$^3$, having a weight of 1,500—2,000 kg., when loaded and provided with wheel assemblies so as to permit the containers to roll over rails in two directions which are perpendicular to each other. Such containers are disclosed in U.S. Pat. No. 3,488,062, issued Jan. 6, 1970.

The stacking of the containers in the first storage room is carried out so that the containers are distributed over the various storeys of the buffer room in the same relationship as they had when in the several ship-holds. This is effected by means of a system of main rails and traverse rails, the main rails communicating with the loading bridges of the mammoth container ship. By means of their wheel assemblies the containers can be moved over the main rails until they arrive at the various traverse rails where they are carried off automatically to the left or to the right of the main rails. Also when employing two or more pairs of main rails, the same principle is used so that the traverse rails extending between two pairs of main rails are fed over one-half of their length from one side and over the other half from the other side. So unloading of the ship can take place almost continuously without unnecessary waste of time, and without assorting the containers as to country of destination nor to local transport.

The storage rooms can be built as a normal quay warehouse with external walls, but they may also be constructed as an open air storage constituted by a number of storeys in the form of stagings. Also such constructions are provided with one or more pairs of main rails and a number of traverse rails extending to the left and to the right.

From the buffer room the containers are again rolled over the traverse rails to the main rails which communicate with main rails extending towards and into the second storage room.

Stacking of the containers in this latter room takes place according to the country or group of countries of destination. To this end each container carries a label indicating the country or group of countries for which the goods in the container are destined. On its way from the (first) buffer room to the second storage room each container passes a monitor or an electric eye provoking in a central control room a signal indicating the country of destination of the container concerned. The control room controls now the further movement of the container towards its proper place in the second storage room. This may be effected by means of a chain mechanism conveying the container over the main rails to the correct section and then to the left or to the right in the section concerned over the traverse rails likewise by means of a chain mechanism until it arrives at its eventual place.

When the buffer room has finally been unloaded all containers are now in a stacked position in the second storage room, namely sorted according to their destination. It has been proven that this system of mutually perpendicular main rails and traverse rails is particularly suitable for the automatic, for instance electronic selection of containers. Hence, according to a further feature of the invention for the selection of containers use is made of a system of mutually perpendicular main tracks and side tracks over which the containers are conveyed from one storage room to the other, whereas the conveyance within the storage rooms is effected over traverse tracks.

A specific advantage is obtained with the method according to the invention in that when employing storage rooms containing multistoreys the containers are conveyed from one storage room to the other in a horizontal plane and the selection is effected by stacking the containers being conveyed to the second storage room in vertical parallel sections thereof and by conveying them from a certain subsection of the vertical section to the third storage room viz. to a similarly oriented subsection thereof and by distributing them over a number of small subsections.

Thus, after the first selection all containers on one storey of the buffer room are present on the same storey of the second storage room but now the containers are stacked according to their destination. The same applied to the third storage room, that is a certain subsection of the second storage room passes over as a whole to the same subsection (same storey of the relevant section) of the third storage room, however distributed over smaller parts of the subsection according to the means of transport. If the first storage room contains five storeys, the containers selected for a certain country will also be stacked in a section of the second storage room five storeys high. Thus a vertical division is made in the second storage room according for instance to destination. The containers in these vertical sections five storeys high are subsection-wise conveyed to corresponding subsections in the third storage room where they are then stacked according to the means of transport.

According to the invention this is preferably effected in that the containers on leaving the first storage room for establishing the first selection enter over the main tracks into the second storage room and are carried off transversely into the relevant subsections, and for effecting the second selection are conveyed in the latter direction to the corresponding subsection of the third storage room and subsequently are carried off in a transverse direction into the particular smaller parts of the subsections in which each subsection is divided.

Preferably the third storage room is divided into two halves which are located on both sides of the second storage room. In this way the path between the storage rooms is considerably shortened. In a practical embodiment side tracks are located between each pair of vertical sections of the second storage room so that alternately the containers in one section are carried off over the side tracks to the right and the containers in the next section are carried to the left, to the corresponding sections of the halves of the third storage room located to the right and to the left of the second storage room. Each section of the third storage room, if destined for a certain country, is divided according to the means of transport in a number of smaller sections or sheds disposed in side-by-side relationship.

From these sheds main rails and side rails are provided leading to the various loading platforms for local transport. Conveniently the loading platforms for local transport are arranged opposite the three sides of the sheds.

It will be obvious that the advantages of the invention result from the combination of storage rooms, specifically multistorey storage rooms for the selection of containers according to their destination and according to the means of transport in that the combination contains three storage rooms of substantially the same capacity, the first one serving as a buffer for receiving directly and without any selection the unloaded containers, the second one being divided into a number of parallel sections and the third one having the same division into sections, but at the same time a further division perpendicular to the former one so that each section thereof is divided in a number of smaller sections, the numbers of the sections and of the smaller sections corresponding to the number of countries of destination and the number of means of transport respectively.

If the available space permits, it is desirable to arrange the entire yard so that the unloading quay for the mammoth container ship, the buffer room, the second storage room and the administration and control center are positioned in register according to the main tracks, to locate on both sides of the second storage room the sheds of the third storage room and on the outer sides thereof the loading platforms for road traffic, and to locate on both sides of the first storage room and on both sides of the control center the loading platforms for local sea transport, inland navigation and rail traffic.

The four loading platforms for rail traffic are interconnected by a ring railway surrounding the yard and having a communication with the railway system.

BRIEF DESCRIPTION OF THE DRAWING

The drawing is a schematic layout of a terminal for unloading of a container vessel and for transfer of the containers to means for local transport.

DESCRIPTION OF THE PREFERRED EMBODIMENT

A compass card shown in the drawing facilitates the orientation of the various installations which may be of rigid or of demountable construction, it being obvious that the position of the compass card as represented in the drawing is not decisive for the actual arrangement of such a station in practice.

One or more loading bridges 9 extend from the mammoth ship 10 towards the buffer room 11 and the latter is provided with a network of main rails 12 in line with the loading bridges and a number of traverse rails to the left and right of the main rails 12.

From this buffer room the containers are to be conveyed to the second room 13 which is also provided on each storey with a network of main rails 14, for instance three in number, and many traverse rails (not shown) extending to the west and to the east, the main rails again being in line with the main rails 12 of the buffer room 11. Before entering the second room 13 the containers, which carry a plate indicating their destination, are monitored and generate signal which is received in a central control room 17 for administration and controlling. From this control room 17 a driving mechanism is energized conveying the containers into the second room towards sections thereof classified according to a certain country or group of countries. In this way the containers are arranged in vertical sections 18 depending on their destination.

In fact this separation has taken place without any hoisting means so that the containers on a certain storey of the buffer room 11 are still present on the same storey of the second room 13 even though they are stored—depending on their destination—in small sections 18 extending for instance in an east-west direction.

Between each pair of vertical sections 18 side rails 15 are arranged perpendicular to the main rails 14 to allow transport of the containers alternately to the east and to the west of the second room 13 towards a number of smaller storage sheds 19 over which the containers are distributed in accordance with the eventual means of local transport.

So the containers in each vertical stack 18 for a certain country or group of countries arrive through the side rails 15 at a number of sheds 19 disposed in side-by-side relationship either to the west or to the east of the second room 13. Supposing the first (and then also the second) room contains 5 storeys, there are 12 countries or groups of countries and 4 means of local transport viz local sea transport, inland navigation, rail traffic and road traffic. This means that there are 48 sheds 19 in total, each 5 storeys high.

From these sheds main rails and side rails lead to the loading platforms. A convenient layout of the yard is shown in the drawing. The yard is built as a peninsula in a bay. When seen in plan the unloading quay 20 for the mammoth ship 10 is due north, the controlling center 17 due south, the loading platforms 21 and 22 for road traffic due west and east respectively. The first and second storage rooms 11 and 13 are established between the unloading quay 20 and the controlling center 17 in a straight line from north to south. Immediately to the west and to the east of the second room 13 which possesses a rather central position, are —in this order—the sheds 19a—d for local sea transport 26, inland navigation 27, rail traffic and road traffic and the loading platforms 21, 22 for road traffic. Loading platforms 23a—c for the other three local transport means are arranged in the four corners, i.e., to the west and to the east of the buffer room 11 and of the controlling chamber 17 or in other words to the north and south of the collection of sheds 19 respectively.

The four loading platforms for rail traffic 23c are interconnected by a ring railway 24 surrounding the yard and having a communication 25 with the railway system.

The loading platforms 22, 21 for road traffic are provided with endless belts for conveying in a direction from west to east and from east to west respectively.

The length of these belts is twice the length of the truck so that a completely charged belt just fills a storey of the truck, it being understood that the containers are placed in pairs. At the beginning of each belt a turn disc 28 is provided allowing the truck driver to assure that the cover of each container is facing outwards.

In this way each container is accessible for custom officers if test samples are to be made on the frontiers.

No time is wasted for unloading the truck which is necessary if a container is stored in such a way that it is inaccessible from the outside.

I claim:

1. A method of controlling the transshipment of containers from a container ship towards loading platforms for various means of regional transportation, comprising the steps of transferring the containers from the ship to a first storage structure serving as a buffer, then after the containers have been so transferred conveying the containers to a second storage structure having substantially the same storage capacity as the first storage structure while sorting the containers according to destination and stacking the containers in groups according to destination in the second storage structure, then after the containers have been so stacked conveying the containers to a third storage structure having substantially the same storage capacity, while keeping the containers in the groups according to destination and sorting each such group into subgroups according to means of regional transportation, and stacking the containers in the third storage structure in groups according to destination divided into subgroups according to means of regional transportation, and then after the containers have been so stacked conveying the containers of each subgroup to a separate loading platform for regional transportation.

2. A method according to claim 1 wherein the containers are conveyed toward each storage structure on main tracks, and are then moved at a right angle to the main tracks on auxiliary tracks in distributing them throughout such storage structure.

3. A method according to claim 2 wherein the containers are stacked in the second storage structure in groups which are spaced in the direction in which the containers are conveyed toward such structure, and the containers are stacked in the third storage structure in subgroups which are spaced in the direction in which the containers are conveyed toward such structure.

4. A method according to claim 2 wherein the containers which have been stacked in the second storage structure in groups spaced in the direction in which the containers are conveyed toward such structure are then conveyed toward the third storage structure in a second direction that is transverse to the former direction, and the containers from each group in the second structure are stacked in subgroups in the third structure which are spaced in the second direction and are in alignment with the position which such group of containers occupied in the second structure.

5. A method according to claim 1 wherein the containers are stacked on more than one storey in each storage structure, and each container is conveyed horizontally from one storage structure to another and is kept on the same storey in all three storage structures.